Nov. 10, 1936.   A. L. LYMAN   2,060,091
PROCESS OF CONVERTING AND REMOVING SULPHUR FROM PETROLEUM
Filed Aug. 13, 1932   3 Sheets-Sheet 1
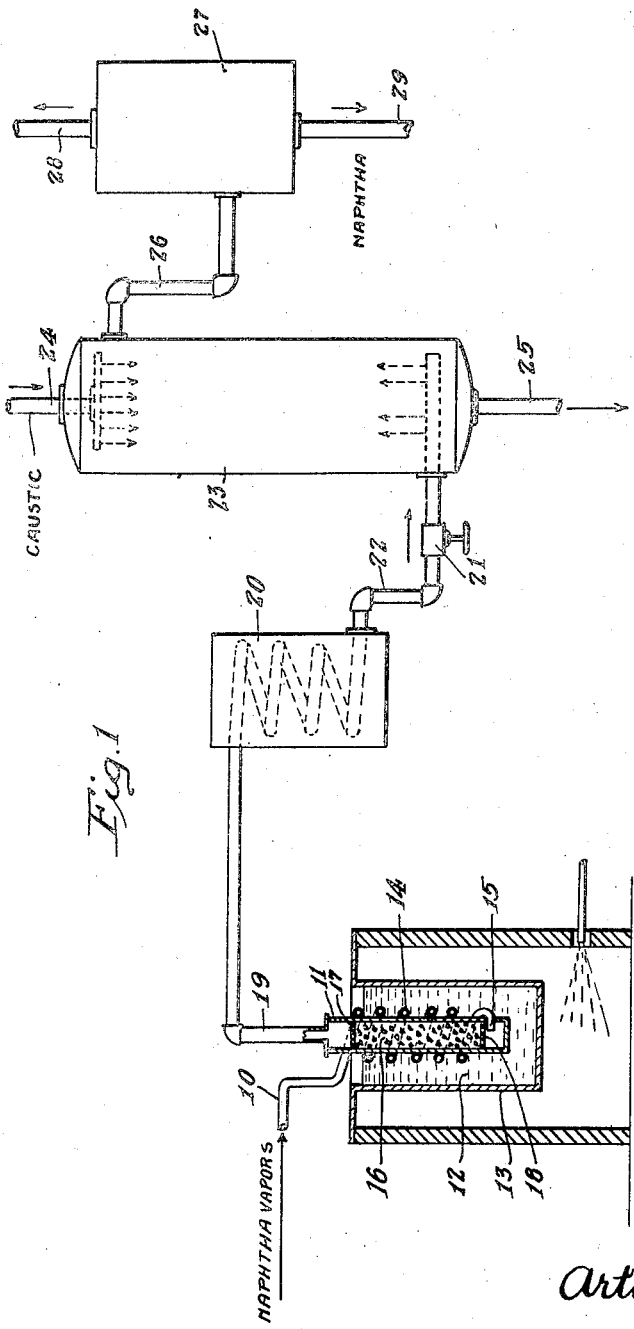
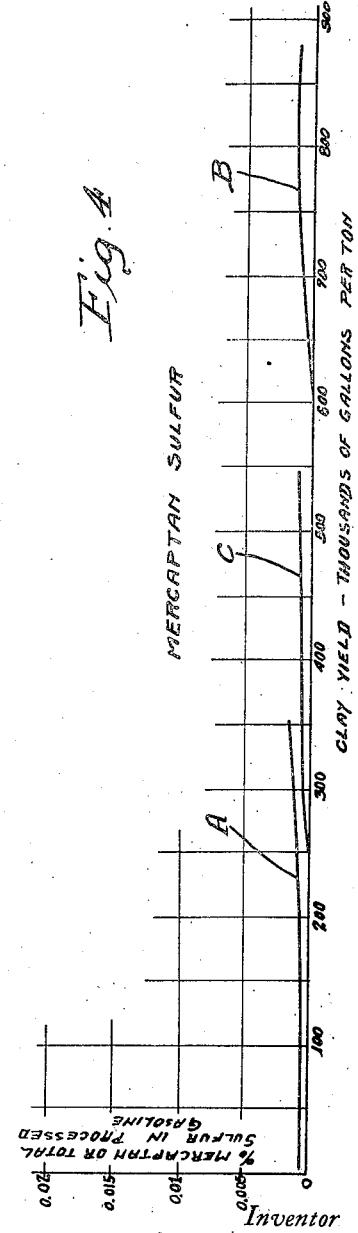
Inventor
Arthur L. Lyman
By Lyon & Lyon
Attorneys

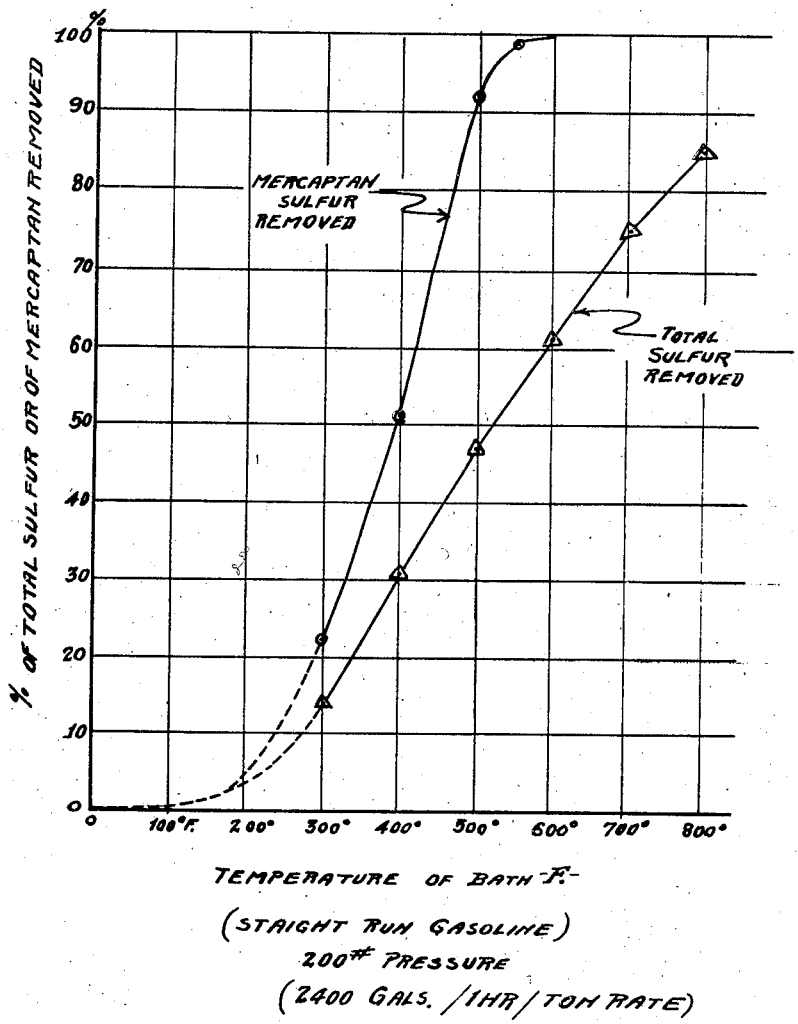

Patented Nov. 10, 1936

2,060,091

UNITED STATES PATENT OFFICE 2,060,091

PROCESS OF CONVERTING AND REMOVING SULPHUR FROM PETROLEUM

Arthur L. Lyman, Berkeley, Calif., assignor to Standard Oil Company of California, San Francisco, Calif., a corporation of Delaware Application August 13, 1932, Serial No. 628,641

6 Claims. (Cl. 196—25)

This invention relates to a process of treating petroleum distillates whereby the sulphur content of the distillates may be reduced in a rapid and economical manner. In general, the process of this invention relates to a method of decomposing organic sulphur bodies such as mercaptans and disulphides in petroleum distillates, converting said organic sulphur bodies into hydrogen sulphide, and then removing the hydrogen sulphide from the distillate.

The process of this invention is primarily catalytic in nature, the conversion of the organic sulphur-containing bodies into hydrogen sulphide taking place in the vapor phase while the petroleum distillates are in contact with a suitable adsorbent. Crude straight run or cracked gasolines or naphthas contain various amounts of sulphur in the form of mercaptans and disulphides, depending upon the source of the crude oils from which they are derived and upon the nature of the distillation process employed in their production. In general, sulphur compounds are considered undesirable in motor fuels. The presence in large amounts of either mercaptans or disulphides is conducive to instability in color and gum-forming tendencies of the petroleum distillate. Ordinarily, attempts are made to remove mercaptans by oxidizing them to disulphides by treatment with doctor solution, by treatment with sulphuric acid, or by adsorption in the liquid phase with adsorbent material such as silica gel. All of these treatments remove or convert mercaptans to a certain extent. The disulphides themselves are difficult to remove and often remain in considerable quantity in the treated distillate. Furthermore, the methods of treatment utilized heretofore have been rather expensive due to the quantities of reagents or adsorbents required.

It has been discovered that mercaptans and disulphides, as well as other sulphur-bearing organic bodies, may be readily removed from petroleum distillates by converting them into hydrogen sulphide and then removing the hydrogen sulphide from the distillate in any suitable manner as, for example, by a caustic wash. The conversion of mercaptans and disulphides into hydrogen sulphides is preferably accomplished while the distillate is in the vapor phase and at a superatmospheric temperature and pressure. The distillate, under these conditions, is brought into contact with a suitable adsorbent which appears to act catalytically upon the organic sulphur-containing bodies. As a result, tremendous quantities of distillate may be treated by a unit film or unit weight of the adsorbent.

It is an object of this invention to disclose and provide a process of removing sulphur from petroleum distillates in a ready, facile and economical manner.

Another object of this invention is to disclose a process of catalytically converting mercaptans and other organic sulphur-containing bodies present in petroleum distillates into hydrogen sulphide and sulphur-free organic bodies.

An object of the invention is to disclose conditions of temperature and pressure whereby mercaptans, disulphides and other organic sulphur-containing bodies present in petroleum distillates, may be converted into hydrogen sulphide and sulphur-free organic bodies for the ready removal of sulphur from said distillate.

A further object of this invention is to disclose and provide a process of removing sulphur from petroleum distillates, said process being characterized by the color stability of the resultant product.

These and other objects, uses and advantages of this invention will become apparent to those skilled in the art from the following detailed description of the process and its preferred modes of operation. In order to facilitate understanding of this invention, reference will be had to the appended drawings, and graphs.

In the drawings:

Fig. 1 is a diagrammatic representation of arrangement of apparatus in which the process may be carried out.

Fig. 2 is a graph illustrating the effect of variations in temperature upon the removal of mercaptan sulphur and total sulphur from a straight run gasoline distillate, by the process of this invention.

Fig. 4 is a graph illustrating the continued efficiency of the catalyst after prolonged use in the process of this invention.

Figure 3:
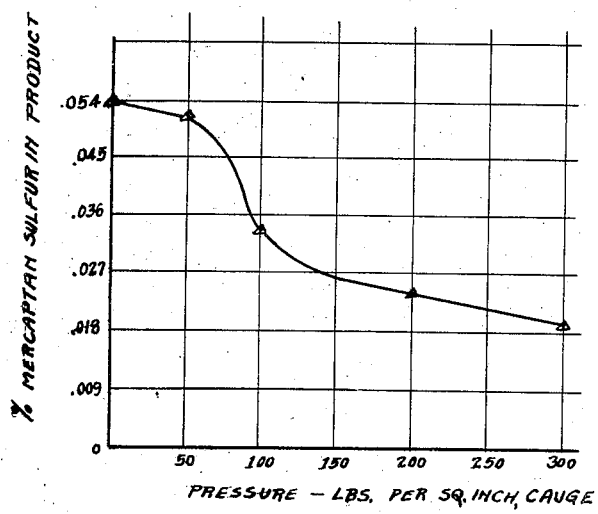
Fig. 3 is a graph illustrating the effect of variations in pressure upon a process of sulphur removal in accordance with disclosures made herein.

As has been stated hereinabove, the process is applicable not only to straight run distillates, but also to cracked distillates.

For purposes of simplicity, however, the attached graphs relate only to the effect of the process on straight run gasolines.

As has been stated hereinabove, the process of this invention is primarily catalytic in nature but it has been found that certain particular conditions of temperature and pressure should be employed in order to produce efficient results. The type of apparatus employed may vary greatly but the type diagrammatically illustrated in Fig. 1 has been found to be effective. As there shown, the vapors of a petroleum distillate containing organic sulphur bodies and mercaptans, may be admitted under suitable pressure, as by line 10, into a coil 14 surrounding a retort or chamber 11 held within a bath of molten metal 12 retained in a suitable receptacle 13 heated to a temperature adapted to maintain the vapors at from about 550° F. to 750° F. The vapors from the coil 14 are admitted into one end of the retort 11, as indicated at 15. The retort 11 is partially filled with a body of suitable adsorbent 16, said body of adsorbent being retained in the retort as by means of top and bottom screens 17 and 18 respectively.

After passing through the body of adsorbent 16, the treated petroleum distillate vapors may be discharged as by means of a line 19 into a condenser indicated at 20. Thereafter the liquefied petroleum distillate may pass into a suitable apparatus for the removal of hydrogen sulphide therefrom.

A valve 21 is preferably located in the discharge line 22 leading from the condenser 20, said valve 21 maintaining the retort 11 as well as the condenser 20 under pressure. The liquefied petroleum distillate discharged from the condenser 20 may pass into an expansion or gas-release chamber or zone adapted to permit vaporization and release of fixed gases and some hydrogen sulphide or, as shown in Fig. 1, the liquefied petroleum distillate is passed into a scrubbing tower 23 where it is contacted with a suitable washing solution such as, for example, a caustic soda solution admitted to the upper end of the scrubbing tower 23 as by means of line 24 and suitable spray heads. The used caustic soda solution may be withdrawn from the tower 23 by means of line 25, whereas the washed distillate may be discharged by line 26. Fig. 1 shows the washed distillate passing into a release tank 27 in which the fixed gases may be separated from the naphtha or distillate, the gases being discharged by line 28 and the distillate discharged by line 29. Instead of employing the release tank 27, the washed distillate may be sent by line 26 into storage tanks or subjected to any suitable further treatment.

It has been found that distillates which have been treated in accordance with this process for the conversion of organic sulphur-containing bodies into hydrogen sulphide and sulphur-free organic bodies, and the hydrogen sulphide then separated from the treated distillate by an alkaline wash, can be highly purified with extremely small quantities of a treating agent such as sulphuric acid. For example, it has been found that as little as 0.025 pound of sulphuric acid per gallon of oil renders the distillates substantially water-white, doctor negative and gum free.

In the process described, superatmospheric pressures are preferably employed and it has been found that unusual advantages are obtained by employing pressures in excess of 50 pounds per square inch. Fig. 3 illustrates the effect of increased pressure during the catalytic conversion of the mercaptans into hydrogen sulphide and sulphur-free organic bodies. The original petroleum distillate contained 0.28% total sulphur and 0.075% mercaptan sulphur. When this distillate was vaporized and passed through a body of adsorbent material (in this particular instance a Florida fuller's earth) at 700° F. but zero gage pressure, the resultant product contained 0.054% mercaptan sulphur. Other conditions being constant, the pressure was increased to 50 pounds per square inch and the mercaptan sulphur content of the product was reduced to 0.051%, a decrease of only 0.003%. When the pressure was increased to 100 pounds per square inch, however, the mercaptan sulphur content of the product was reduced to 0.034% and even a greater decrease in sulphur content was obtained at higher pressures, as indicated by Fig. 3. For this reason, the preferred process employs pressures in excess of 50 pounds per square inch so as to utilize the increased catalytic effect of the adsorbent on the conversion of the mercaptans into hydrogen sulphide and sulphur-free organic bodies.

Fig. 2 illustrates the effect of temperature on the efficiency of the process. It is to be noted that although about 20% of mercaptan sulphur may be removed by operating at a temperature of 300° F., about 92% is removed by operating at a temperature of 500° F. Temperatures of 550° F. to 750° F. are preferably employed wherever it is desired to produce a substantially doctor negative, color stable, petroleum distillate. The data in Fig. 2 was obtained by passing a straight run gasoline through a body of adsorbent at a constant pressure of 200 pounds, the vapors being passed through the adsorbent at the rate of 2400 gallons of petroleum distillate per hour per ton of adsorbent.

Although the preferred operating range is from about 550° F. to 750° F., higher temperatures may be employed. Attention is drawn to the fact that the evolution of fixed gases, such as hydrogen and methane, ethane, ethylene, and the like, is increased at higher temperatures. For example, although substantially no fixed gases are evolved when the treatment is carried out at 700° F. and only about 1.75 cubic feet of gas per gallon of distillate is evolved at a treating temperature of 750° F., the production of fixed gases is increased to between 4 and 6 cubic feet per gallon at a temperature of 800° F. For this reason, the petroleum distillates are preferably treated at temperatures of between about 550° F. and 750° F., in the substantial absence of fixed gases such as hydrogen and the lower gaseous hydrocarbons.

Figure 5:
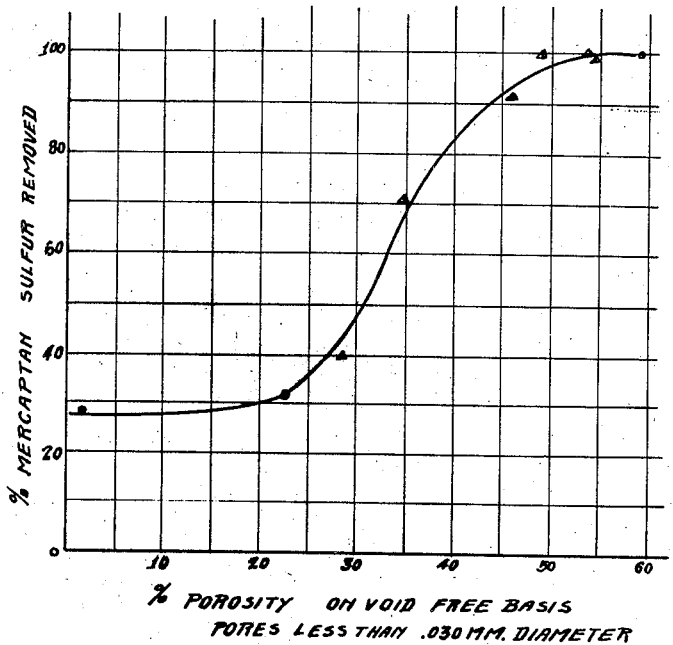
Fig. 5 is a graph illustrating the relationship between the porosity of the catalyst and the removal of mercaptan sulphur from petroleum distillates treated thereby in accordance with this process.

Moreover, it has been found that the effectiveness of the adsorbent used as a catalytic agent for the decomposition of sulphur bodies in gasolines and naphthas, is definitely related to its porosity. Fig. 5 discloses this relationship in which the per cent porosity on a void-free basis is plotted as abscissa and the per cent of mercaptan sulphur removed as ordinates. Porosity as used herein relates to interstices or pores of a diameter less than 0.03 millimeter and it is seen that materials having more than 30% porosity on a void free basis, said porosity being attributable to pores of less than 0.030 millimeter in diameter and are markedly much more effective than those of lower porosity.

It is evident from an examination of Fig. 5, for example, that materials having a porosity of more than about 40%, will cause the conversion of more than 90% of the mercaptan sulphur into readily removed hydrogen sulphide, whereas materials having a porosity of only 25% will cause the conversion of only about 35% of the mercaptan sulphur into hydrogen sulphide. For this reason, the most effective embodiment of the process of this invention employs catalytic materials or adsorbents containing more than about 30% porosity on a void-free basis, said porosity being attributable to pores of less than 0.030 millimeter in diameter.

The pycnometer method of measuring porosity, following the procedure outlined by Washburn and Bunting in Jones American Ceramic Soc. No. 5, 1922, p. 53, was used in making the determinations here reported. This method depends upon difference in penetrating characteristics of mercury and water, the volume of mercury and pressure required to force it into pores, making it possible to evaluate the porosity of the material in terms of volume of pores below a fixed size.

By the term "adsorbent" or "catalytic material", as used herein, reference is made to materials such as colloidal clays, fuller's earth, silica, bauxite, pumice, activated charcoal and alumina and the like which all have considerable porosity and, in general, considerable adsorbent power also. However, the catalytic activity of these materials appears to depend on their porosity, as described above, rather than on their qualities as adsorbents.

It may be stated that the data shown in Fig. 5 was obtained on a straight run gasoline treated at a uniform temperature of 700° F. and a pressure of 200 pounds per square inch, the feed rate being 10 liquid volumes per bulk volume of catalyst per hour. Similar results are obtained under other operating conditions.

That the process described herein is catalytic in nature, is evidenced by several factors. For example, upon condensation of the distillate vapors and removal of the hydrogen sulphide by extraction with water and/or caustic soda solution, or by fractionation, no polymerization of hydrocarbon constituents and no appreciable rise in end boiling point is noted. Furthermore, the length of life of the catalyst body is extremely great and no resinous, gummy or asphaltic material is retained upon the catalyst. The process has been carried out continuously and it has been found that up to 20,000 barrels of petroleum distillate can be effectively treated with one ton of catalyst. A very minor amount of polymerization of pressure gasolines apparently occurs but this is not significant and is almost immeasurable when referred to in terms of yield of treated product; its effect only becomes apparent when expressed in terms of length of life of the catalyst and even then extremely long life of catalyst is obtained.

Fig. 4 diagrammatically illustrates the effect of protracted passage of petroleum distillates through a body of catalytic material in accordance with this process. The ordinates of this graph represent the per cent of mercaptan sulphur in the processed petroleum distillate. The abscissa represents the number of thousands of gallons of distillate treated per ton of adsorbent. Graph A indicates that the first 150,000 gallons of distillate treated contained less than about 0.0005% mercaptan sulphur and even when 350,000 gallons of the distillate had been passed through a ton of adsorbent, the mercaptan sulphur content of the product was only 0.0015%. In other words, the effectiveness of the adsorbent had not been appreciably impaired. Graph A was obtained on a straight run gasoline originally containing about 0.07% mercaptan sulphur and the catalytic conversion of the mercaptans into hydrogen sulphide was carried out at a pressure of 200 pounds per square inch and at a temperature of 600° F. These illustrative runs, A, B, and C, were made at feed rates of 10 volumes of distillate for each bulk volume of catalyst hourly.

Graph B represents the results on a West Texas straight run gasoline, the treatment in this instance being carried out a temperature of 700° F. and at a pressure of 100 pounds per square inch. The original gasoline contained 0.062% mercaptan sulphur. It is to be noted that the product contained no detectable mercaptan sulphur even after 600,000 gallons of the distillate had been treated by one ton of the catalyst. Even after 850,000 gallons of distillate had been passed through the adsorbent the mercaptan sulphur content of the product was only 0.0015%.

The catalyst employed in runs A and B, shown in Fig 4, was a Florida clay having a porosity of about 59% on a void-free basis, this porosity being attributable to pores of less than 0.03 millimeter in diameter.

Graph C was obtained on a run made at 700° F. and a pressure of 200 pounds per square inch, using an adsorbent clay as the catalyst, this clay having about 53% porosity on a void-free basis. The original gasoline distillate here treated contained 0.093% mercaptan sulphur. Attention is called to the fact that the product was free from mercaptan sulphur even after 250,000 gallons of distillate per ton of adsorbent had been passed therethrough. After 550,000 gallons of distillate per ton of adsorbent had been processed, the mercaptan sulphur content of the product was only 0.001%.

Fig. 4 indicates the tremendously long life that the adsorbents have in the process of this invention. Actually, one run was carried to nearly 2,000,000 gallons per ton at a very high treating rate and 90% of the mercaptans were still being destroyed or converted into readily removable hydrogen sulphide and sulphur-free organic bodies. This, of course, clearly indicates that the process of this invention is truly catalytic in nature.

From the detailed characteristics of the process as described hereinabove, it is to be observed that the process of this invention permits the production of substantially sulphur-free, doctor negative, color stable gasolines and naphthas in a very ready and economical manner. The color of the distillates is improved; the sulphur content of the distillates is decreased and the treated distillates are extremely susceptible to further refining. Although ordinary acid treatment has but slight effect on the mercaptan sulphur content of straight run gasolines and it is therefore necessary to subject them to a subsequent doctor treatment, the products of this invention do not require the use of a doctor solution or other sweetening compound. Furthermore, the amount of acid used in the subsequent treatment of the petroleum distillates treated by this process is extremely small.

In other words, whereas it would be necessary to use 0.1 pound of 98% acid and a subsequent doctor treatment upon a petroleum distillate in order to produce a product which would be negative to the doctor test, the same distillate treated in accordance with this process required only from 0.025 to 0.05 pound of 98% acid and no doctor treatment to produce a finished product which was negative to the doctor test. Furthermore, the product treated in accordance with this invention was stable in color, that is, the color would not drop to below +26 color, as measured by Saybolt chromometer, after 24 hours exposure to sunlight, whereas ordinary petroleum distillates treated with sulphuric acid and a doctor solution would revert to positive doctor on exposure to sunlight and often revert in color to 19 or below.

Although specific operating data has been disclosed hereinabove and the process has been described in considerable detail, it is to be understood that in view of the variations in characteristics of different distillates, numerous changes and modifications can be made as will be apparent to those skilled in the art.

All such changes and modifications as come within the scope of the appended claims are embraced thereby.

I claim:

1. In a continuous method of treating petroleum distillates for the removal of sulphur therefrom in the virtual absence of hydrogen, the steps of catalytically decomposing mercaptans and other sulphur bearing bodies present in petroleum distillate, with the formation of hydrogen sulphide, by continuously passing vapors of said petroleum distillate at a temperature of between 550° F. and 750° F. and at a pressure of above 50 pounds gauge, through a bed of finely divided adsorbent having more than 30% porosity on a void-free basis attributable to pores of 0.030 millimeter in diameter, said passage of petroleum distillate through said adsorbent being at a rate of between about 5 and 25 liquid volumes of distillate per hour per bulk volume of adsorbent.

2. In a continuous method of treating petroleum distillates for the removal of sulphur therefrom in the absence of an added hydrogenating gas, the steps of catalytically decomposing mercaptans and other organic sulphur-bearing bodies, present in a petroleum distillate with the formation of hydrogen sulphide, by continuously passing vapors of said petroleum distillate at a temperature of between 550° F. and 750° F. and at a pressure of above 50 pounds gauge, through a bed of finely divided adsorbent having more than 30% porosity on a void-free basis attributable to pores of 0.030 millimeter in diameter, said passage of petroleum distillate through said adsorbent being at a rate of between about 5 and 25 liquid volumes of distillate per hour per bulk volume of adsorbent, condensing the treated distillate, and then separating the hydrogen sulphide from the treated distillate.

3. A method of treating petroleum distillates for the removal of sulphur therefrom, which comprises the catalytic decomposition of mercaptans and other organic sulphur-containing bodies present in a petroleum distillate into hydrogen sulphide, by contacting said petroleum distillate in vapor phase in the virtual absence of hydrogen at a temperature of between 550° F. and 750° F. and at a superatmospheric pressure, with a body of finely divided adsorbent having more than 30% porosity on a void-free basis attributable to pores of less than 0.030 millimeter in diameter, separating the treated petroleum distillate vapors from the adsorbent, and then separating hydrogen sulphide from the distillate.

4. A method of treating petroleum distillates for the removal of sulphur therefrom, comprising: forming a bed of finely divided adsorbent having more than 30% porosity on a void-free basis attributable to pores of less than 0.030 millimeter in diameter; passing a petroleum distillate containing mercaptans, while in vapor phase, through said bed at a temperature of above 550° F. but below that at which cracking occurs, and at a pressure above 50 pounds, at a rate adapted to catalytically convert mercaptans of said distillate into hydrogen sulphide; discharging the treated petroleum distillate vapors and hydrogen sulphide from the bed of adsorbent; condensing the treated distillate and then separating the hydrogen sulphide from the distillate.

5. A method of treating petroleum distillates for the removal of sulphur therefrom, comprising: forming a bed of finely divided adsorbent having more than 30% porosity on a void free basis attributable to pores of less than 0.030 millimeter in diameter; passing a petroleum distillate containing mercaptans, while in vapor phase, through said bed at a temperature of between 550° F. and 750° F. and at a pressure above 50 pounds, at a rate of between 5 and 25 volumes of distillate per hour per bulk volume of adsorbent whereby mercaptans present in said disfillate are catalytically converted into hydrogen sulphide; discharging the treated petroleum distillate vapors and hydrogen sulphide from the bed of adsorbent; condensing the treated distillate and then separating the hydrogen sulphide from the distillate.

6. A method of treating petroleum distillates for the removal of sulphur therefrom comprising: forming a bed consisting of a clay type adsorbent having more than 30% porosity on a void free basis attributable to pores of less than 0.030 millimeter in diameter; decomposing mercaptans present in a petroleum distillate by passing vapors of such distillate through said bed at a temperature of between 550° F. and 750° F. and a pressure of about 50 pounds gauge, whereby $H_2S$ is formed from said mercaptans; and discharging vapors of distillate and $H_2S$ from said bed.

ARTHUR L. LYMAN.

CERTIFICATE OF CORRECTION.

Patent No. 2,060,091.  November 10, 1936.

ARTHUR L. LYMAN.

It is hereby certified that error appears in the printed specification of the above numbered patent requiring correction as follows: Page 4, first column, lines 43 and 44, claim 2, for the words "in the absence of an added hydrogenating gas" read in the virtual absence of hydrogen; and that the said Letters Patent should be read with this correction therein that the same may conform to the record of the case in the Patent Office.

Signed and sealed this 16th day of February. A. D. 1937.

(Seal)

Henry Van Arsdale
Acting Commissioner of Patents.